F. WESTERMAN.
DEPOSITING MACHINE.
APPLICATION FILED MAY 22, 1918.
1,438,280.
Patented Dec. 12, 1922.
5 SHEETS—SHEET 5.
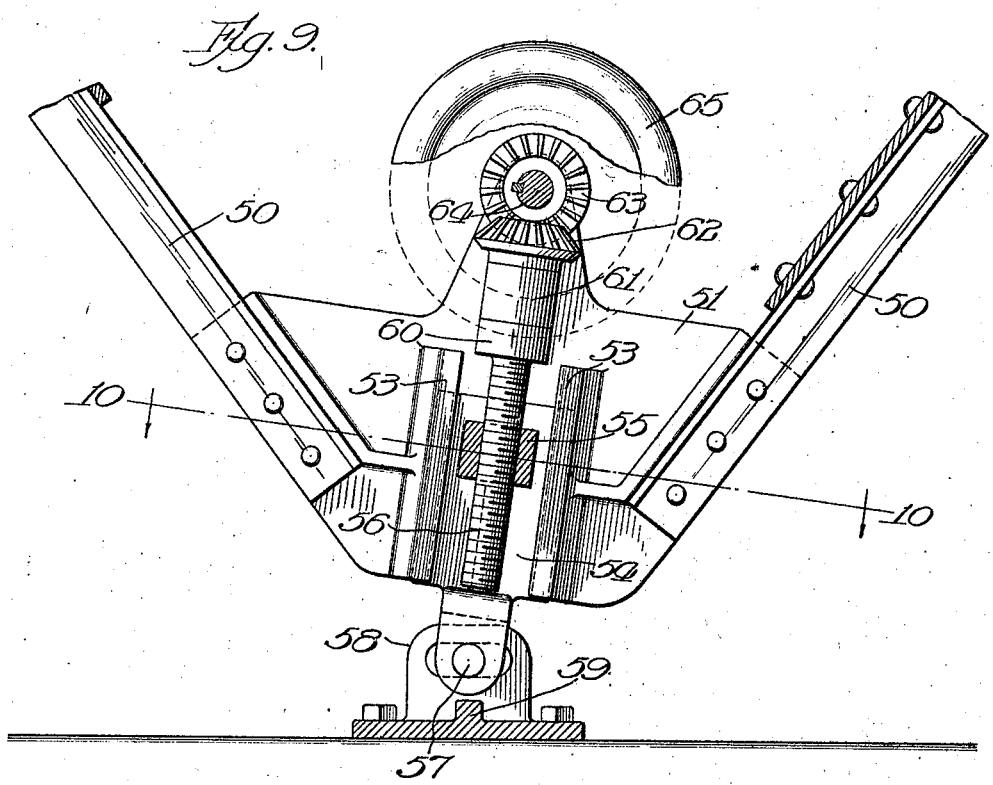
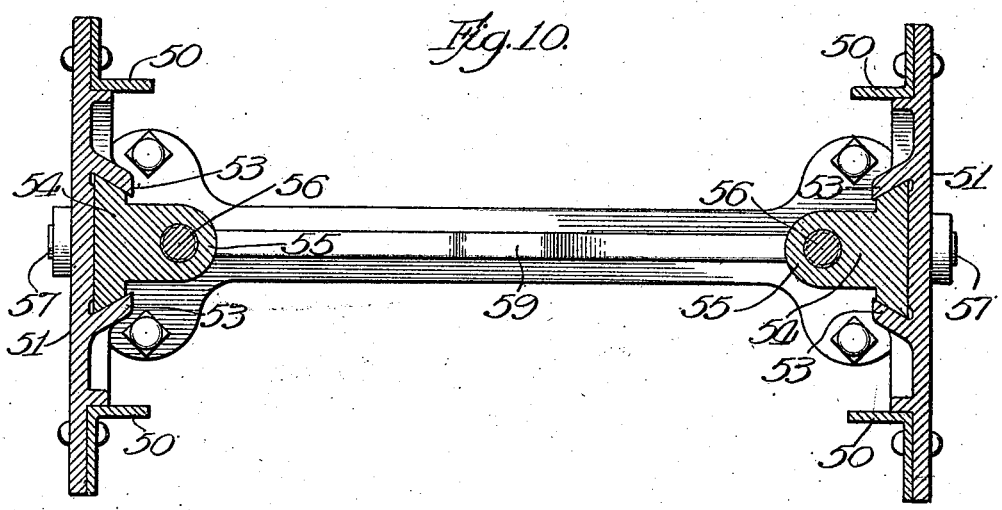
Inventor:
Frederick Westerman
By: Peirce, Fisher & Clapp
Attys.

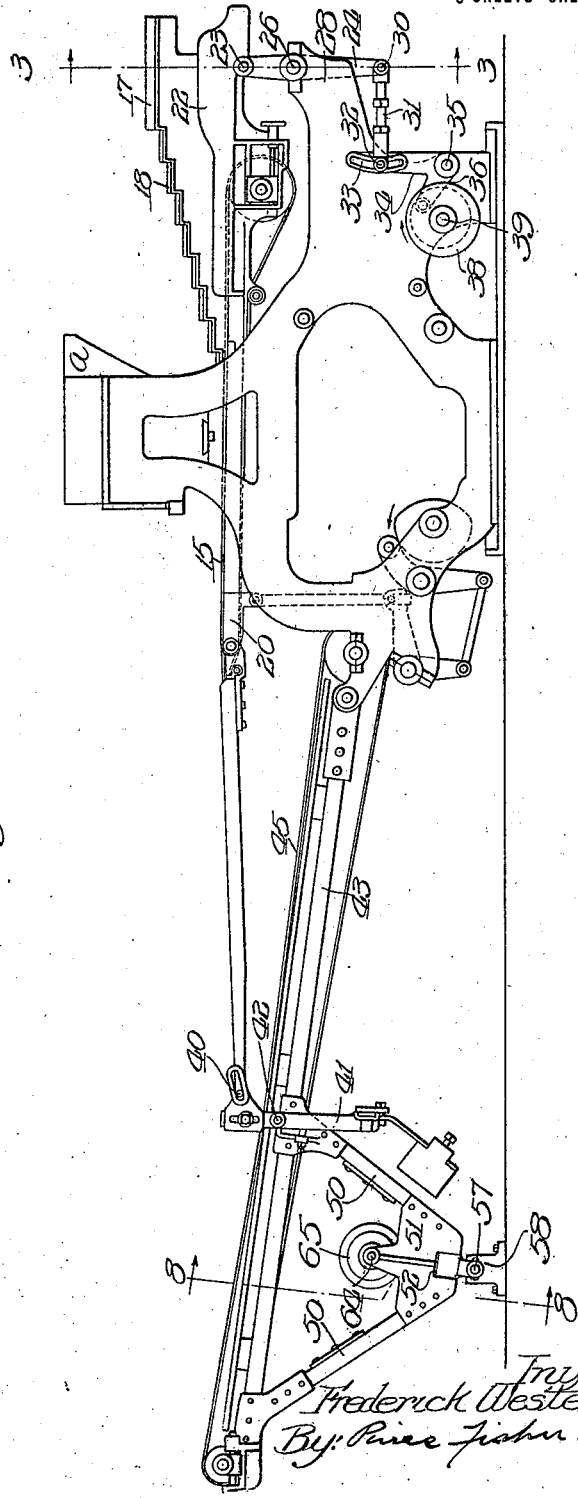

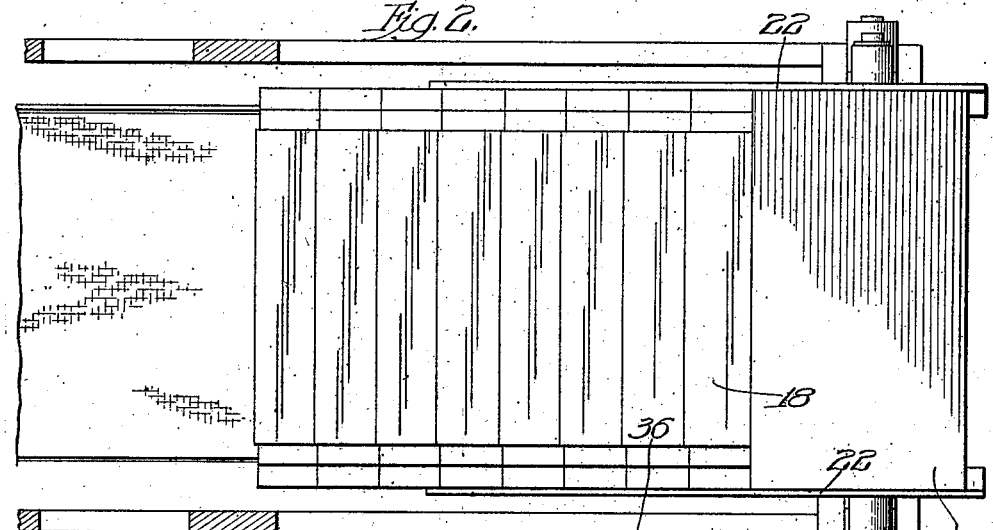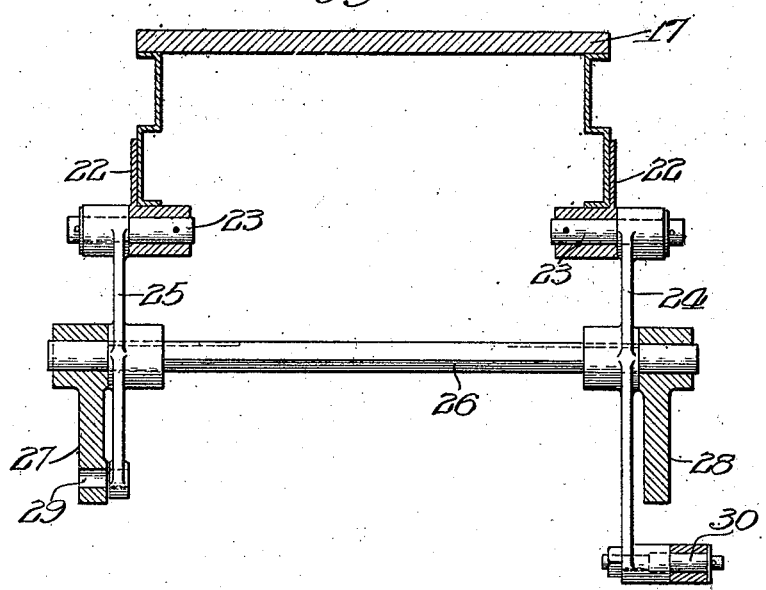

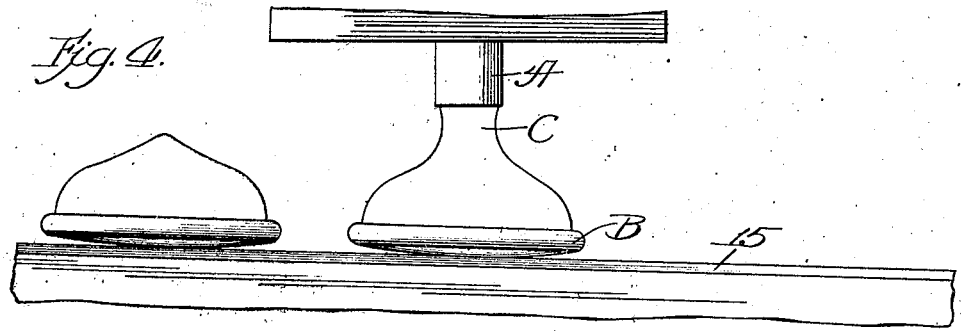
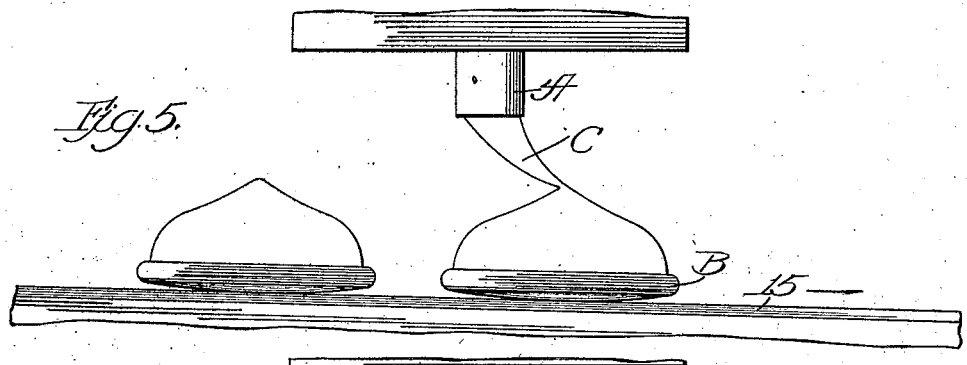
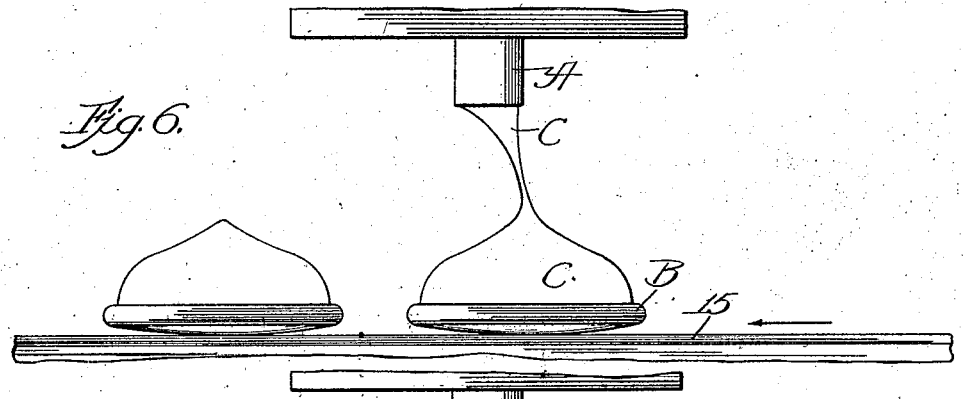
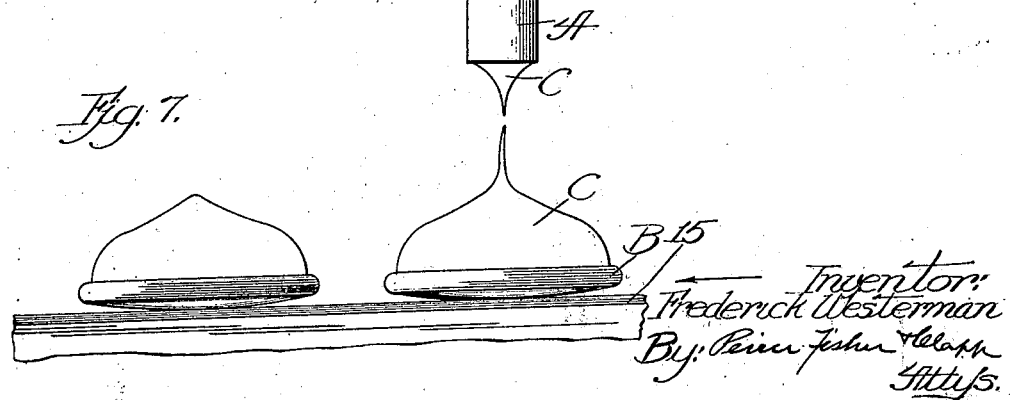

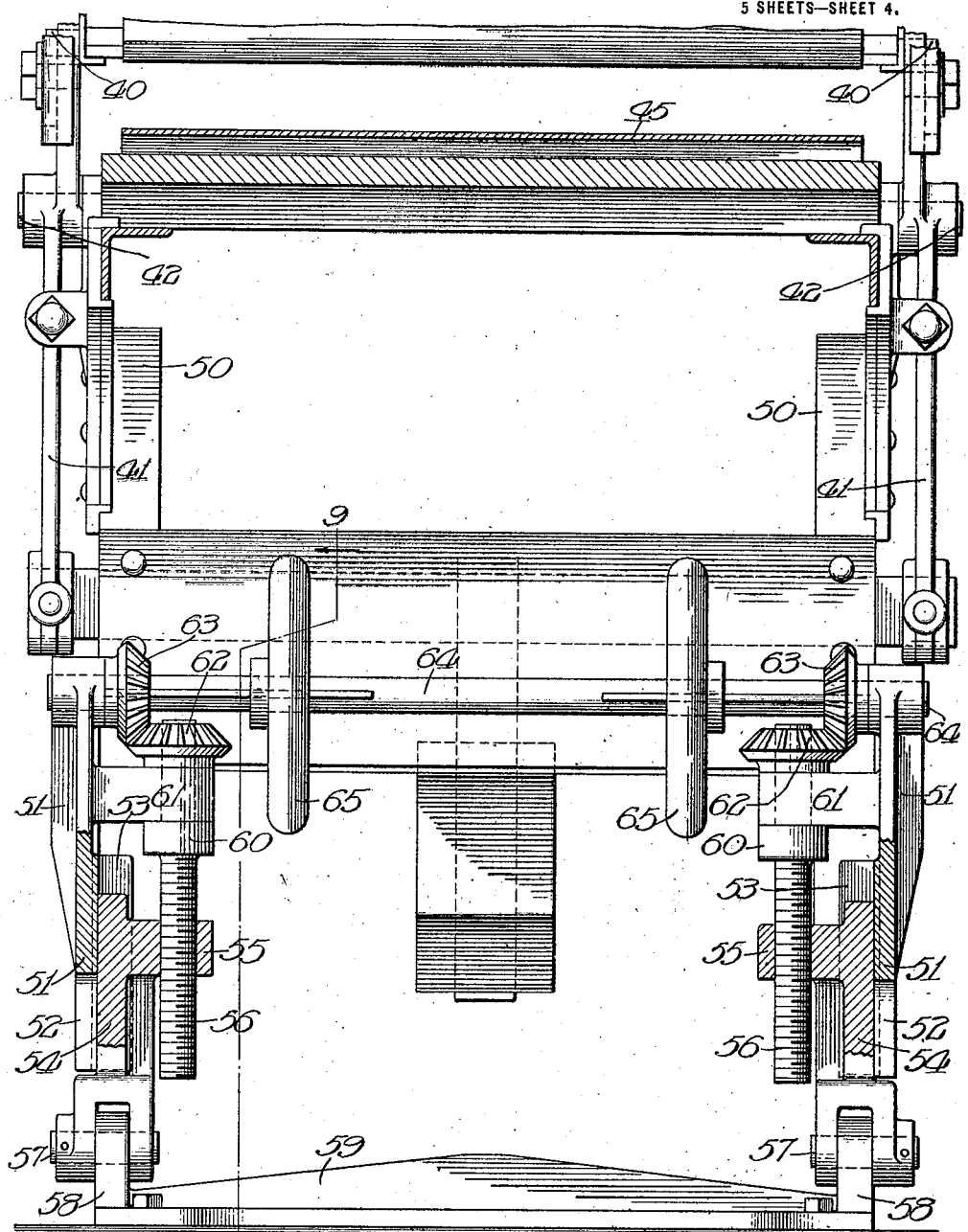

Patented Dec. 12, 1922.

1,438,280

UNITED STATES PATENT OFFICE.

FREDERICK WESTERMAN, OF CHICAGO, ILLINOIS.

DEPOSITING MACHINE.

Application filed May 22, 1918. Serial No. 235,928.

*To all whom it may concern:*

Be it known that I, FREDERICK WESTERMAN, a citizen of the United States, residing at Chicago, in the county of Cook and State of Illinois, have invented certain new and useful Improvements in Depositing Machines, of which I do declare the following to be a full, clear, and exact description, reference being had to the accompanying drawings, forming part of this specification.

The present invention has relation to machines more particularly designed for depositing confection upon rows of cakes, a sample of this type of machine being set forth in Letters Patent Nos. 1,121,430 and 1,121,431, granted to me December 15, 1914, to which patents reference may be had for a better understanding of certain of the parts herein illustrated and not particularly described, since they form no part of the invention claimed herein.

Figure 1 is a view in side elevation of a depositing machine embodying my invention. Figure 2 is a plan view of the front end portion of the machine. Figure 3 is a view in vertical section on the line 3—3 of Fig. 1. Figures 4, 5, 6 and 7 are enlarged views showing the manner of depositing the confection upon the surfaces of the cakes. Figure 8 is a view upon an enlarged scale in vertical section on line 8—8 of Fig. 1. Figure 9 is a detail view in vertical section on line 9—9 of Fig. 8. Figure 10 is a view in horizontal section on the line 10—10 of Fig. 9.

The main object of the present invention is to insure a more accurate and uniform distribution of the confection upon the surface of the cakes and to this end the invention consists in the features of novelty hereinafter described, illustrated in the accompanying drawings and particularly pointed out in the claims at the end of this specification.

In prior depositing machines, such for example as that set forth in my above mentioned Letters Patent No. 1,121,430, the cakes to be coated are advanced in rows beneath a series of nozzles arranged across the bottom of one or more receptacles that contain the confection such as marshmallow, chocolate, icing, or the like, and as each row of cakes is brought beneath the row of nozzles, the longitudinal movement of the carrier belt is temporarily arrested and this belt, with the cakes thereon, is raised to a point in proximity to the nozzles through which the coating material is delivered onto the cakes. After the confection is thus delivered onto the cakes, the carrier belt is lowered so as to break off the streams of coating material and the belt is then intermittently advanced so as to bring the succeeding rows of cakes beneath the nozzles. In practice, it is found that as the streams of confection from the nozzles separate from the material deposited upon the cakes, there is a tendency of the thinned portion or "peak" of the confection deposited on the cake to tip over rearwardly as the carrier belt advances longitudinally, particularly if the longitudinal advance of the carrier belt occurs before the breaking of the streams of confection between the nozzles and the cakes is completely effected. On the other hand, if the intermittent movement of the carrier belt to advance the cakes is delayed to insure the complete separation of the streams of confection between the nozzles and the cakes, the speed of the machine is necessarily delayed. My invention contemplates providing means whereby, in addition to its usual step-by-step forward movement and its raising and lowering movement, the carrier belt shall be given a slight movement preferably towards the front and then towards the rear of the machine at the time that the belt is being lowered to break the streams of confection between the discharge nozzles and the cakes. By this means, the breaking of the streams of confection between the nozzles and the cakes is more quickly effected so that a faster operation of the machine may be had and the uniform distribution of the confection on the surface of the cakes is insured.

In Figures 4 and 7 of the drawings, I have illustrated the manner in which the confection is delivered to the cakes and the streams of confection are broken between the cakes and the discharge nozzles. In these views of the drawings, A designates the discharge nozzles arranged beneath the confection receptacle *a*, B denotes the sakes and C designates the confection that is deposited upon the surface of the cakes B, the cakes being supported upon an endless carrier belt 15. When the carrier belt 15 with the rows of cakes thereon is raised to the position shown in Fig. 4 of the drawings, the confection C forced through the nozzles A will pass onto the cakes B and when the proper amount of confection has been deposited upon the cakes, the carrier belt 15 will begin to descend from the position shown in Fig. 4 towards the position shown in Fig. 5 and at the same time the carrier belt (and its supporting means) will be moved in the direction of the arrow, Fig. 5, towards the front of the machine, this downward and forward movement of the carrier belt serving to thin the stream of confection between the nozzles A and the cakes B; but before the stream of confection C is completely severed between the nozzles and the cakes, the carrier belt will move in the direction of the arrow, Figs. 6 and 7, downwardly and rearwardly from the position shown in Fig. 5 to the positions shown in Figs. 6 and 7 successively. As the carrier belt thus descends and moves towards the rear of the machine, the streams of confection will continue to be attenuated, and as the carrier reaches the limit of its downward movement will be broken as indicated in Fig. 7, this breaking of the streams of confection occurring when the cakes are centrally beneath the nozzles A. It will be understood, of course, that the "peaks" of confection C on the cakes B, as shown in Fig. 7, will settle down until they assume the position shown at the left-hand side of Fig. 7. The result of this operation is not only to expedite the breaking of the streams of confection between the discharge nozzles and the cakes, but to insure that the cakes shall be centrally beneath the nozzles at the time the streams are broken, so that any tendency to drag the "peaks" of confection to one side of the center is avoided.

The above described back-and-forth movement of the carrier belt to break the streams of confection and centralize the "peaks" of confection on the cakes, is shown as accomplished by a bodily movement of the belt and its supports, as distinguished from the "step-by-step" movement of the belt; and preferably, the said back-and-forth movement occurs while the "step-by-step" feed of the belt is idle.

In the machine shown in the drawings, the feeding of the cakes is effected from the main platform 17 down a series of superposed, relatively fixed and movable feeding steps or devices 18, such as are shown by the above mentioned Letters Patent, the cakes being finally delivered in rows onto the carrier belt 15. This carrier belt 15 is supported by a buckling frame 20, as in my aforesaid Letters Patent, and may be intermittently advanced and raised and lowered in the manner therein set forth.

Instead of supporting the carrier belt and the feeding mechanism for delivering cakes thereto in a manner incapable of back and forth longitudinal movement, as in the machine of my aforesaid patent, I support the carrier belt (and as shown also) the feeding mechanism, so that a longitudinal back and forth movement may be given to the feeding belt, in addition to its usual step-by-step and its raising and lowering movement. Preferably, the side bars 22 of the frame that supports the carrier belt 15 and the feeding mechanism are provided with studs 23 to which are pivoted the upper ends of rock arms 24 and 25 that are keyed to a rock shaft 26 mounted in suitable bearings in the sides 27 and 28 of the main frame of the machine. One of the rock arms 25 is preferably formed with a hole in its lower end (see Fig. 3) adapted to come in line with a hole 29 in the side bar 27 of the main frame, for a purpose to be presently stated. The other rock arm 24 has pivotally connected thereto, as at 30, an adjustable link 31, the opposite end of which is mounted upon a pin 32 adjustably held within a segment slot 33 formed in the upper end of a bell crank lever 34 that is mounted on a stud 35 projecting from the main frame of the machine. The lower arm of the bell crank lever 36 is provided with a pin 37 carrying a friction sleeve that works in the cam groove formed on the inner face of the cam wheel 38. This cam wheel 38 is keyed to the shaft 39 and by suitable gearing is connected with the main drive shaft.

From the foregoing description it will be seen that when the cam wheel 38 is revolved in the direction of the arrow Fig. 1, the bell crank lever 34 will be oscillated and impart an oscillatory movement to the rock arm 24, which in turn will effect an oscillation of the side bars 22 of the frame that supports the carrier belt 15. The movement of the cam wheel 38 will be so timed with respect to the mechanism whereby the step-by-step feeding of the rows of cakes beneath the discharge nozzles is effected and the raising and lowering of the rows of cakes are accomplished, that the operation of breaking the streams of confection between the discharge nozzles and the cakes will be substantially as hereinbefore described and as illustrated in Figs. 4, 5, 6 and 7 of the drawings. By providing adjusting mechanism between the cam wheel 38 and the support for the carrier belt, the movement of the carrier belt back and forth can be adjusted according to the coating material being used, or for other reasons.

My object in providing one of the rock arms 25 (see Fig. 3) with a hole in its end adapted to coincide with the hole 29 in the main frame, is to permit a pin to be inserted through these holes in order to retain the frame that supports the feeding mechanism and the carrier belt against back and forth longitudinal movement when, for any reason, is is not deemed necessary to impart such movement to the carrier belt. This is sometimes desirable in coating cakes with certain kinds of confection; and when the carrier belt is to be held against such back and forth movement, it will be understood that the link 31 between the cam wheel 38 and the rocking arm 24 (see Fig. 1) will be disconnected. In coating cakes with certain kinds of confections and under certain conditions, it will be found desirable to so oscillate the carrier belt that instead of having an initial movement towards the front and a later movement towards the rear, as above described, these movements can be reversed,—that is to say, the oscillatory movement will be initially towards the rear and then towards the front. My invention presents the first instance, so far as I am aware, of a depositing machine in which in addition to its up and down and step-by-step movement, the carrier belt has an oscillatory movement imparted thereto.

In the present machine, as in that of my hereinbefore mentioned Letters Patent, the carrier belt 15 passes around a small idle roller 40 at its discharge end, this idle roller being shown as so mounted as to permit a slight raising and falling movement of the carrier belt, the arms 41 that support the discharge portion of the carrier belt being journaled upon pivots 42 on the frame 43 beneath it. This frame 43 sustains a tray carrier belt 45 on which will rest the trays wherein the coated cakes will be delivered, as well understood by those familiar with the operation of this class of machines.

The frame 43 is pivotally supported at its inner end and inclines upwardly and rearwardly therefrom. One object of the present invention is to provide the frame 43 that supports the tray carrier belt 45 with adjusting mechanism whereby the angle of inclination of this frame 43 can be varied, and whereby, also, the angle of inclination of the rear portion of the upper carrier belt 15 may also be varied. In coating cakes with certain kinds of confection it is found in practice, and particularly in warm weather, that as the cakes are carried down the inclined rear portion of the carrier belt 15, there is a tendency of the confection to flow or become unevenly distributed on the surface of the cakes. So, also, after the cakes have been delivered into the trays on the tray carrier belt 45 and pass upward along the discharge portion of such belt 45, the confection is apt to flow in reverse direction. By my present invention, which provides means for adjusting the angle of inclination of the carrier belts 15 and 45, a more uniform distribution of the confection on the surface of the cakes can be accomplished, regardless of the temperature in which the coating of the cakes is being effected. To effect this adjustment of the carrier belts, I prefer to provide the frame 43 (see Figs. 1, 8, 9 and 10) with side supporting bars 50 that are connected at their bottoms by plates or castings 51. As shown, each of these plates or castings 51 is formed with an opening 52 and upon its inner face (see Figs. 9 and 10) with dovetail ribs 53 in which are mounted the dovetail slide blocks 54. Each of these slide blocks 54 is formed with a threaded arm 55 through which passes an adjusting screw 56. The lower end of each of the slide blocks 54 is bifurcated, as shown in Figs. 8 and 9, and is pivotally connected, as by a pin 57, with an upstanding lug 58 at the end of the base plate 59. The upper end of the threaded adjusting rod 56 is formed with a shoulder 60 that bears against the lug 61 projecting inwardly from the plate or casting 51, through which lug 61 the plain portion of the rod 56 passes. To the upper end of the rod 56 is connected a beveled pinion 62 that meshes with a corresponding beveled pinion 63 that is keyed upon a shaft 64, the ends of which shaft are journaled in the upper portions of the plates or castings 51. On the shaft 64 are mounted one or more hand wheels 65 whereby the shaft may be turned, and by turning the shaft 64 the adjusting rods 56 may be raised and lowered and will correspondingly lift the plates or castings 51 and the frame 43 supported thereby. By this means, it will be seen that the angle of inclination of the frame 43, and consequently the angle of inclination of the upper carrier belt 15 can be varied, for the purpose hereinbefore stated.

While I have shown what I regard as the preferred embodiment of my invention, I wish it understood that the details of construction above set out may be varied within wide limits without departing from the scope of the invention and that features of the invention may be adopted without its adoption as an entirety.

Having thus described my invention, what I claim as new and desire to secure by Letters Patent is—

1. In a depositing machine, the combination with a support for the cakes whereon confection is to be deposited and with a receptacle for containing such confection and with means whereby a relative movement in vertical direction between said receptacle and said support is effected, of means for imparting a slight back and forth movement to one of said parts during the latter part of the depositing operation.

2. A depositing machine comprising the combination with means for supporting material after it has been deposited, a receptacle for said material and mechanism for advancing the deposited material beneath said receptacle, of means for raising and lowering said supporting means and for imparting thereto a slight back-and-forth movement in addition to the raising and lowering movement.

3. In a depositing machine, the combination with a receptacle for material to be deposited, an endless carrier for supporting the material discharged from said receptacle, and means for decreasing the distance between the discharge nozzle of said receptacle and said carrier when the material is to be deposited, of means for imparting to said carrier a slight back-and-forth movement in addition to said raising and lowering movement.

4. In a depositing machine, the combination with a receptacle for confection to be deposited, an endless carrier for supporting the cakes whereon the confection is to be deposited and with means for raising and lowering said carrier, of means for imparting to said carrier a slight back-and-forth movement in addition to said raising and lowering movement, and means for feeding cakes in rows onto said carrier.

5. In a depositing machine, the combination with an endless carrier belt for the cakes whereon confection is to be deposited and supports for said carrier belt, a receptacle for containing said confection and mechanism for advancing said cakes beneath said receptacle, of means for imparting a back and forth movement to said carrier belt and its supports during the latter part of the depositing operation.

6. A depositing machine comprising the combination with means for supporting the cakes whereon confection is to be deposited, a receptacle for said confection and mechanism for advancing cakes beneath said receptacle, of means for raising and lowering said support for the cakes, rock arms for sustaining said support, and means for imparting back and forth movement to said rock arms.

7. A depositing machine comprising the combination of means for supporting the cakes whereon confection is to be deposited, a receptacle for said confection and mechanism for advancing cakes beneath said receptacle, of means for raising and lowering said support for the cakes, rock arms for imparting to said support a slight back and forth movement, and cam mechanism for shifting said rock arm.

8. A depositing machine comprising the combination of means for supporting the cakes whereon confection is to be deposited, a receptacle for said confection and mechanism for advancing cakes beneath said receptacle, of means for raising and lowering said support for the cakes, rock arms for imparting to said support a slight back and forth movement, cam mechanism for shifting said rock arm, and means for adjusting the movement of said rock arms.

9. In a depositing machine, the combination of a receptacle for confection, an endless carrier whereon the confection for the cakes is to be deposited, a second carrier disposed beneath the first and adapted to receive the cakes therefrom, and a support for said carriers adjustable vertically to vary the inclination of said carriers.

10. In a depositing machine, the combination with a receptacle for confection, an endless carrier for supporting the cakes whereon the confection is to be deposited, a second endless carrier for supporting trays into which the cakes will be delivered from said first mentioned carrier, and adjusting mechanism for varying the angle of inclination of said carriers.

11. In a depositing machine, the combination with a receptacle for confection and an endless carrier for supporting the cakes whereon confection is to be deposited, a second endless carrier extending below said first mentioned carrier, a frame for supporting the discharge end portion of said first mentioned carrier and for supporting said last mentioned carrier, and mechanism for vertically adjusting said frame to vary the angle of inclination of said carriers.

12. In a depositing machine, the combination with a receptacle for confection and an endless carrier for supporting the cakes whereon confection is to be deposited, a second endless carrier extending below said first mentioned carrier, a frame for supporting the discharge end portion of said first mentioned carrier and for supporting said last mentioned carrier, and mechanism for vertically adjusting said frame to vary the angle of inclination of said carriers, said adjusting mechanism comprising vertically disposed screws and means for turning said screws to adjust said frame.

13. In a depositing machine, the combination with a receptacle for confection and an endless carrier for supporting the cakes whereon confection is to be deposited, a second endless carrier extending below said first mentioned carrier, a frame for supporting the discharge end portion of said first mentioned carrier and for supporting said last mentioned carrier, said frame comprising side portions, a base plate and vertical parts pivotally connected to said base plate, adjusting screws disposed between said vertical bars and said side frames, and means for turning said adjusting screws to raise and lower said frame.

FREDERICK WESTERMAN.